United States Patent
Defrance et al.

(10) Patent No.: US 9,567,784 B2
(45) Date of Patent: Feb. 14, 2017

(54) HOOK LATCH FITTED WITH A POSITIONING DEVICE AND A METHOD FOR ASSEMBLING SUCH A LATCH

(75) Inventors: Vincent Defrance, Bourges (FR); Etienne Luneau, Segry (FR)

(73) Assignee: LISI Aerospace, Paris (FR)

( * ) Notice: Subject to any disclaimer, the term of this patent is extended or adjusted under 35 U.S.C. 154(b) by 712 days.

(21) Appl. No.: 13/279,217

(22) Filed: Oct. 21, 2011

(65) Prior Publication Data

US 2012/0151724 A1    Jun. 21, 2012

(30) Foreign Application Priority Data

Oct. 25, 2010   (FR) .................................. 10 58745

(51) Int. Cl.
*E05C 5/00* (2006.01)
*E05C 19/12* (2006.01)
(Continued)

(52) U.S. Cl.
CPC ............. *E05C 19/145* (2013.01); *B64D 29/06* (2013.01); *E05B 63/06* (2013.01); *Y10T 24/45435* (2015.01)

(58) Field of Classification Search
CPC ........ E05C 19/14; E05C 19/145; E05C 19/12; E05C 19/10; E05B 65/0811; E05B 15/0086; E05B 65/0817
(Continued)

(56) References Cited

U.S. PATENT DOCUMENTS 2,904,141 A * 9/1959 Henrichs ........................ 403/321
4,053,177 A * 10/1977 Stammreich .......... E05C 19/145
292/113
(Continued)

FOREIGN PATENT DOCUMENTS

FR        2 458 657 A1    1/1981

OTHER PUBLICATIONS

A. Wagner, Institut National de la Propriété Industrielle (République Française), Preliminary Search Report, May 3, 2011, 6 Pages, France.

*Primary Examiner* — Kristina Fulton
*Assistant Examiner* — Faria Ahmad
(74) *Attorney, Agent, or Firm* — Henricks, Slavin & Holmes LLP

(57) ABSTRACT

The invention relates to a hook latch (73) configured so as to lock and unlock a mobile structure on a fixed structure of a vehicle, said latch having
an adapter (69) fitted with a hook (73) capable of fastening a keeper,
a handle comprising a trigger,
on the handle, a second pivot connection axis,
on the trigger, at least one hook capable of fastening at least one protrusion (125) of a bracket (121) connected to the adapter,
a third pivot connection axis, around which the handle and the adapter are guided in rotation in relation to each other, and
characterised in that it comprises an adjustment device for adjusting the flushness of the upper surface of the handle in relation to the aerodynamic surface, said device comprising
the bracket (121), (Continued)

a screw (129) capable of being screwed and unscrewed within a first tapped recess of the adapter.

11 Claims, 4 Drawing Sheets

(51) Int. Cl.
*E05C 19/14* (2006.01)
*E05C 19/10* (2006.01)
*B65D 45/00* (2006.01)
*B65D 45/30* (2006.01)
*B65D 45/32* (2006.01)
*E05B 63/06* (2006.01)
*B64D 29/06* (2006.01)

(58) Field of Classification Search
USPC ...... 292/113, 256, 256.73, 95, 96, 100, 194, 292/195, 200, 256.69, 247, DIG. 49, 292/DIG. 60, 73, 340, 341.18, 341.19, 292/139, DIG. 31
See application file for complete search history.

(56) References Cited

U.S. PATENT DOCUMENTS

| | | |
|---|---|---|
| 4,116,479 A | 9/1978 | Poe |
| 4,530,529 A | 7/1985 | Poe et al. |
| 4,602,812 A | 7/1986 | Bourne |
| 4,828,299 A * | 5/1989 | Poe ............................... 292/139 |
| 5,011,200 A * | 4/1991 | Glancy ................. E05C 19/145 292/113 |
| 5,620,212 A * | 4/1997 | Bourne .................. B64D 29/06 292/113 |
| 5,984,382 A | 11/1999 | Bourne et al. |
| 6,343,815 B1 | 2/2002 | Poe |
| 6,382,690 B1 | 5/2002 | Dessenberger, Jr. |
| 7,131,672 B2 * | 11/2006 | Pratt et al. ..................... 292/113 |
| 8,864,185 B2 * | 10/2014 | Do ................................ 292/105 |
| 8,864,189 B2 * | 10/2014 | Fournie et al. .......... 292/256.69 |
| 2012/0102842 A1* | 5/2012 | Fournie ................. E05C 19/145 49/503 |

* cited by examiner

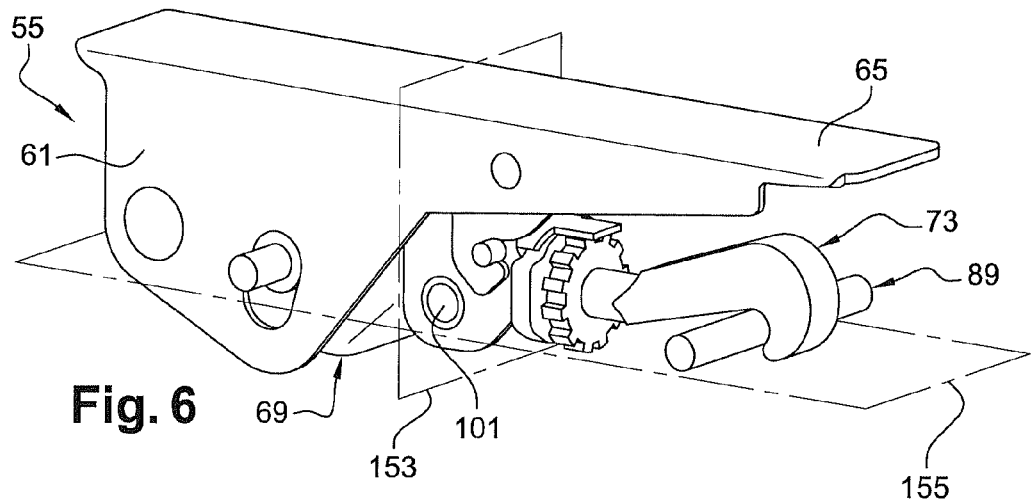
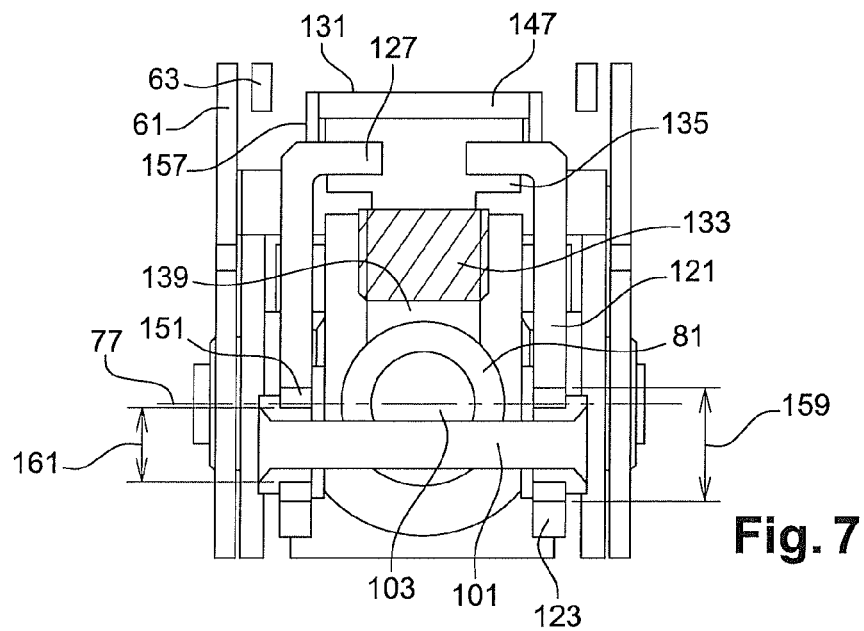
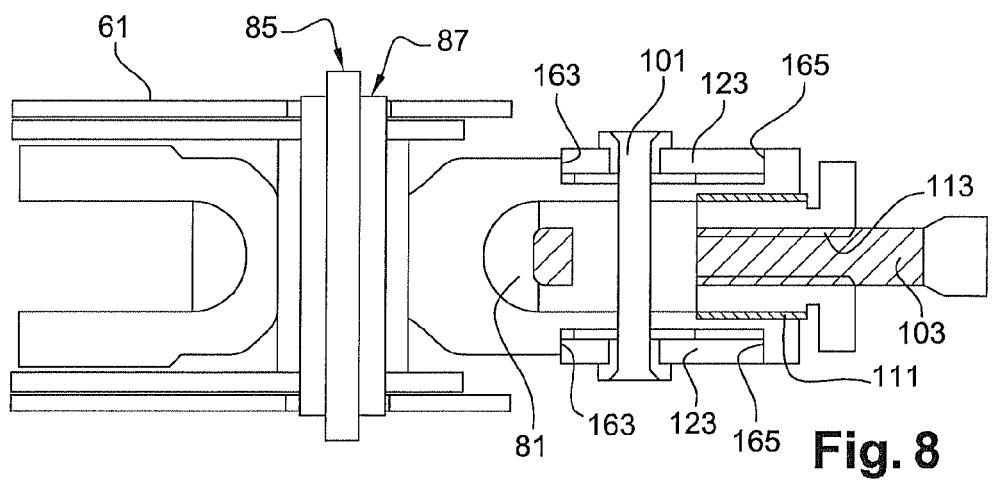

HOOK LATCH FITTED WITH A POSITIONING DEVICE AND A METHOD FOR ASSEMBLING SUCH A LATCH

TECHNICAL FIELD OF THE INVENTION

This invention relates to a hook latch fitted with a positioning device. The technical field of the invention relates, in a general manner, to that of locking and unlocking devices. More particularly, the invention relates to hook latches intended for locking and unlocking a mobile structure on a fixed structure of a vehicle, for example an aircraft-type apparatus.

TECHNOLOGICAL BACKGROUND OF THE INVENTION

In the prior art, the technical teachings of documents U.S. Pat. Nos. 5,984,382A, 6,343,815B1, 6,382,690B1 and 7,131,672B2 are known to disclose hook latches.

Typically, such latches can either be connected to the fixed structure of the apparatus and capable of fastening and maintaining its mobile structure, or be connected to its mobile structure and capable of fastening its fixed structure to attach said structure.

FIG. 1 represents, in a schematic manner, a cross-section of a hook latch 11 according to one embodiment from the prior art in its environment and in a locked non-flush position. In this example, the latch 11 is assembled onto a mobile structure 13 of an aircraft so as to fasten a keeper 15 positioned on a fixed structure 17. For two distinct surfaces, a flush position implies a position in which the former two surfaces form a single surface.

The latch 11 comprises a handle 19 and a fastener known as an adapter 21, in which a hook 23 is assembled via a fitting part such as a nut 25. The nut 25 adjusts the sinking of the hook 23 within a recess 27 of the adapter 21. The handle 19 and the adapter 21 are assembled via a rivet 29 located at one end of the latch 11 opposite the hook 23. The rivet 29 extends along an axis 31 of rotation of the adapter 21 in relation to the handle 19. A locking element such as a trigger 33 secures the handle 19 in its closed position.

The mobile structure 13 has a second pivot connection axis 35 around which the latch 11 assembly is guided in rotation. In this example, the second pivot connection axis 35 is substantially parallel to the first axis 31 and is materialised by a rod 37 fixed in relation to the mobile structure 13 and passing through a strut 39 connected to the handle 19.

The hook 23 has a shape capable of fastening the keeper 15 extending along a third axis 41 parallel to the first two axes 31 and 35.

The adapter 21 has an overall cylindrical section 43 in which the recess 27 is fitted, which is partially tapped. A first pin 45 passes through the cylindrical section 43, thus fulfilling the function of locking the hook 23 in rotation in relation to the adapter 21. In this example, the pin 45 extends along an axis perpendicular to a rod 49 of the hook 23.

The hook 23 extends into the threaded rod 49, said rod being capable of being screwed, via this threading and the adjustment nut 25, within the recess 27 of the adapter 21. For this purpose, the nut 25 is threaded and tapped.

The handle 19 has an upper surface 51, in theory intended to be positioned flush with an aerodynamic surface 53 of the apparatus so as not to reduce the overall aerodynamics of the apparatus. However, due to the various manufacturing and assembly tolerances, it appears that the upper surface 51 of the latch 11 is often, as shown in this example, in a non-flush position, i.e. the ends of the handle 19 are not aligned with the aerodynamic surface 53 of the apparatus, which represents a considerable reduction in aerodynamics, an increase in aerodynamic drag and therefore a significant increase in the amount of fuel consumed by the apparatus.

For mobile structures with high aerodynamic stresses, for example aircraft radomes, i.e. the domes located at the front end of the aircraft generally protecting a radar antenna, the effect of the flushness of the latches with the upper surface is vital. This type of latch, although frequently used, therefore creates a major technical problem for one of ordinary skill in the art. In the prior art, in order to try to improve the positioning of the upper surface of hook latches, the only solution considered by one of ordinary skill in the art consists in adjusting, on the fixed structure of the apparatus and via a complex adjusting device, the fastening point for the hook. However, this solution requires the latch to be unlocked so as to separate the mobile elements from the structure and thus access the adjustment system for the fastening point. This leads to a non-negligible loss of time, and therefore a lengthy downtime for the apparatus. Moreover, this requires the implementation of human means and the use of specific tooling.

GENERAL DESCRIPTION OF THE INVENTION

In the invention, in order to correct the aforementioned disadvantages, an adjustment device has been produced, directly integrated into the latch. More precisely, the device according to the invention is materialised, in one preferred embodiment, by a bracket associated with a screw, the bracket being adapted to overlap the adapter and a screw being screwed into the latter.

The invention therefore relates to a hook latch configured so as to lock and unlock a mobile structure on a fixed structure of a vehicle, one of the two structures bearing a first pivot connection axis around which the latch assembly is guided in rotation, said latch having an adapter fitted with a hook capable of fastening a keeper connected to the other structure, a handle comprising a trigger, at least one of the handle and trigger having an upper surface intended to be positioned flush with an aerodynamic surface of the vehicle, on the handle, a second pivot connection axis, around which the trigger is guided in rotation within the handle, on the trigger, at least one hook capable of fastening at least one protrusion of a bracket connected to the adapter, a third pivot connection axis, around which the handle and the adapter are guided in rotation in relation to each other, characterised in that it has an adjustment device for adjusting the flushness of the upper surface of the handle in relation to the aerodynamic surface, said device comprising the bracket, having two lateral plates, on one of which are located the protrusion and one upper connection plate, a screw adapted to be screwed and unscrewed within a first tapped recess of the adapter, a screw head resting against said upper plate.

By virtue of these provisions, a simple screwing or unscrewing operation of the screw enables the adjustment of an angle formed by the handle and the adapter. Said device does not require the structures of the apparatus to be developed in any way and enables adjustment operations to be performed on the fasteners of the fixed structure.

According to particular characteristics, the screw head has a toothed periphery, the adapter comprises a retaining strip resting against said periphery.

By virtue of these provisions, the rotation of the screw can be stopped at a desired position.

According to particular characteristics, the upper plate of the bracket is substantially perpendicular to the two lateral plates and has a notch capable of accommodating a shaft of the screw, said plates having sections located parallel to each other, the adapter comprises four walls parallel to each other and in contact with said sections, the screw has, on its shaft, at a distance from the head substantially corresponding to the thickness of the bracket, a shoulder substantially perpendicular to said shaft.

By virtue of these provisions, the adapter guides the bracket when screwing and/or unscrewing the screw, and the head and the shoulder are in contact, on either side, with the upper plate of the bracket when the shaft of the screw is engaged within the notch of the bracket. Therefore, the gap between the protrusions of the bracket and the adapter can be varied, i.e. the angle formed by the handle and the adapter around the third axis.

According to particular characteristics, the retaining strip has either a V-shaped cross-section, the point of the V being configured so as to be inserted into the hollows of the toothing of the screw head.

or a slit capable of housing a notch of the peripheral toothing of the screw head.

The inventors have determined that these two provisions are optimal.

According to particular characteristics, the adapter has a second recess substantially perpendicular to the first recess, at least partially tapped and within which a threaded rod of the hook is screwed via a threaded and tapped intermediate fitting part, a pin passing through said adapter and said recess and capable of coming into contact with a notch made within said rod.

By virtue of these provisions, the cooperation of the pin with the notch locks the hook in rotation.

According to particular characteristics, the lateral plates of the bracket have two oblong openings capable of allowing the pin to pass through, said openings having a cross-section adapted to an adjustment of the bracket clearance in relation to the adapter, said adjustment being performed according to a predetermined range of adjustment, the retaining strip extends perpendicularly in the direction of the hook so as to rest against a toothed periphery of the fitting part.

By virtue of these provisions, the rotation of the fitting part can be stopped at a desired position.

According to particular characteristics, the threaded rod of the hook comprises a heel capable of abutting against the pin when the hook moves to exit the first recess.

By virtue of these provisions, despite the vehicle vibrations inherent upon its operation, the adapter hooks cannot become disconnected by themselves and thus cause the mobile structure to come away from the fixed structure, said disconnection representing a significant danger for passengers.

According to particular characteristics, the pin has a circular cross-section and the notch is either a hollow machined in the threaded part of the rod, said hollow having a flat bottom and curved ends capable of taking on the shape of the pin, the curved end opposite the hook constituting the heel.

or an oblong-shaped slit machined through the threaded end of the rod and capable of taking on the shape of the pin, one curved end of the slit, opposite the hook, constituting the heel.

The inventors have determined that these two provisions are optimal.

According to particular characteristics, the heel is a protrusion extending in a direction substantially perpendicular to a plane passing by the summits of the threads of the hook.

By virtue of these provisions, the heel can be fitted onto a rod of a hook in the prior art.

The invention also relates to a method for assembling a hook latch, in which a handle and a trigger are machined and assembled, a hook, a pin and a threaded and tapped intermediate fitting part are machined, the hook extending into a rod at least partially threaded, an adapter is moulded by creating two recesses therein, extending along axes substantially perpendicular to each other, said recesses are tapped and said adapter is transversely bored, then the adapter and the handle are assembled by means of a first rivet extending along a pivot connection axis, characterised in that, an adjustment device is machined for adjusting the flushness of the handle in relation to an aerodynamic surface of the vehicle, said adjustment device comprising a bracket and a screw, then said device is screwed within one tapping of the adapter, and the threaded rod of the hook within the other tapping, then the pin is inserted through the bracket and the adapter.

By virtue of these provisions, the unscrewing operation for the hook performed by an operator cannot be excessive, i.e. cannot cause the rod of the hook to become dislodged, said dislodging representing a considerable loss of time when installing the latch.

The invention also relates to a method for adjusting the flushness of an upper surface of a handle of a hook latch with regard to an aerodynamic surface of a vehicle, the latch being configured so as to lock and unlock a mobile structure on a fixed structure of the vehicle, the latch also having an adapter assembled with the handle via a pivot connection axis around which they are guided in rotation in relation to each other, wherein the latch is closed, a level of flushness or non-flushness between the upper surface of the handle and the aerodynamic surface of the vehicle is assessed, for example by measuring, then if the flushness corresponds to a predetermined result, the adjustment is validated, or if the flushness does not correspond to said result, the latch is opened and an angle formed by the handle and the adapter is adjusted by screwing or unscrewing a screw of a flushness adjustment device installed within the latch, then the latch is closed, then the flushness or non-flushness is reassessed, if the flushness corresponds to the predetermined result, the adjustment is validated, or if the flushness does not correspond to the predetermined result, the level of non-flushness is reduced to obtain said result.

By virtue of these provisions, the flushness of the upper surface of the latch in relation to the skin of the apparatus can be adjusted in a simple and quick manner, and the aerodynamics of the apparatus can thus be optimised.

The invention and its different applications will be better understood after reading the following description and after examining the accompanying figures.

BRIEF DESCRIPTION OF THE FIGURES

These are intended for purposes of illustration only and are not intended to limit the scope of the invention. The figures show:

FIG. 6: a schematic representation of an oblique perspective view of the same hook latch according to one embodiment of the invention in a locked position;

FIG. 7: a schematic representation of a first close-up cross-section of the same hook latch according to one embodiment of the invention in a locked position;

FIG. 8: a schematic representation of a second close-up cross-section of the same hook latch according to one embodiment of the invention in a locked position;

DETAILED DESCRIPTION OF THE PREFERRED EMBODIMENTS OF THE INVENTION

In these figures, identical elements keep the same reference numbers.

Figure 1:
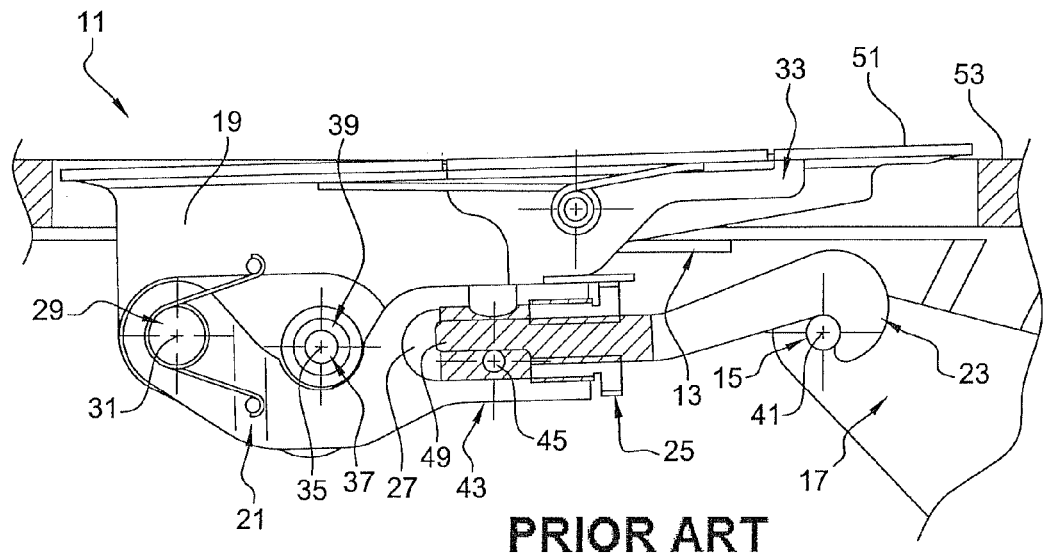
FIG. 1, previously described: a schematic representation of a cross-section of a hook latch according to one embodiment from the prior art in its environment and in a locked non-flush position.
Figure 2:
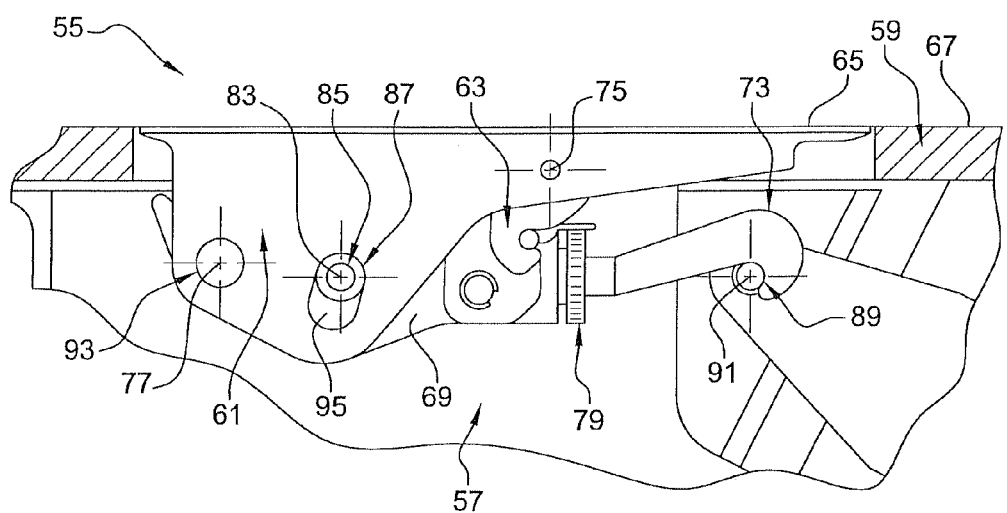
FIG. 2: a schematic representation of a side view of a hook latch according to one embodiment of the invention in its environment and in a locked flush position.

FIG. 2 represents, in a schematic manner, a side view of a hook latch 55 according to one embodiment of the invention in its environment and in a locked flush position.

In this example, the latch 55 has a plane of symmetry passing through its centre.

The latch 55 is configured so as to lock and unlock a mobile structure 57 on a fixed structure 59 of an apparatus such as an aircraft. In this example, the apparatus is an aeroplane and the mobile structure 57 is a radome.

The latch 55 has a handle 61 comprising a trigger 63. The handle 61 has an upper surface 65 intended to be positioned flush with an aerodynamic surface 67, commonly called a skin, of the fixed structure 59, in addition to two lateral flat surfaces substantially perpendicular to the upper surface 65.

The latch 55 also comprises an adapter 69 extending, in its locked position, along direction substantially parallel to that of the flat surfaces of the handle 61, and extending, on one side, into an elbow 71 directed towards the handle 61, and on the other side into a hook 73.

The handle 61 has a first pivot connection axis 75 around which the trigger 63 is guided in rotation. The latch 55 has a second a pivot connection axis 77, around which the handle 61 and the adapter 69 are guided in rotation in relation to each other.

The hook 73 is assembled in the adapter 69 via a fitting part such as a nut 79. The nut 79 adjusts the sinking of the hook 73 within a first recess 81 of the adapter 69.

The mobile structure 57 has a third pivot connection axis 83 around which the latch 55 assembly is guided in rotation. In this example, the third pivot connection axis 83 is substantially parallel to the first and second axes 75 and 77 and is materialised by a rod 85 fixed in relation to the radome 57 and passing through a strut 87 connected to the handle 61.

The hook 73 has a shape capable of fastening a keeper 89 extending along a fourth axis 91 substantially perpendicular to the main axis of the hook 73 and connected to the fixed structure 59 of the aeroplane. In this example, the keeper 89 is materialised by a rod.

In this example, the second pivot connection axis 77 is substantially parallel to the first axis 75 and is materialised by a rivet 93.

In order to allow for the adequate locking of the latch 55 assembly, the third axis 83 is misaligned in relation to a plane, not represented, connecting the second axis 77 and the fourth axis 91.

In this example, the handle 61 has an oblong-shaped notch 95 configured so as to initially let said handle be raised by 15° via pressure applied by an operator on an edge of the upper surface of the trigger 63. Secondly, the operator pulls on one end of the handle 61 to unlock and slide the hook 73 on the keeper 89 so as to free this hook.

Figure 3:
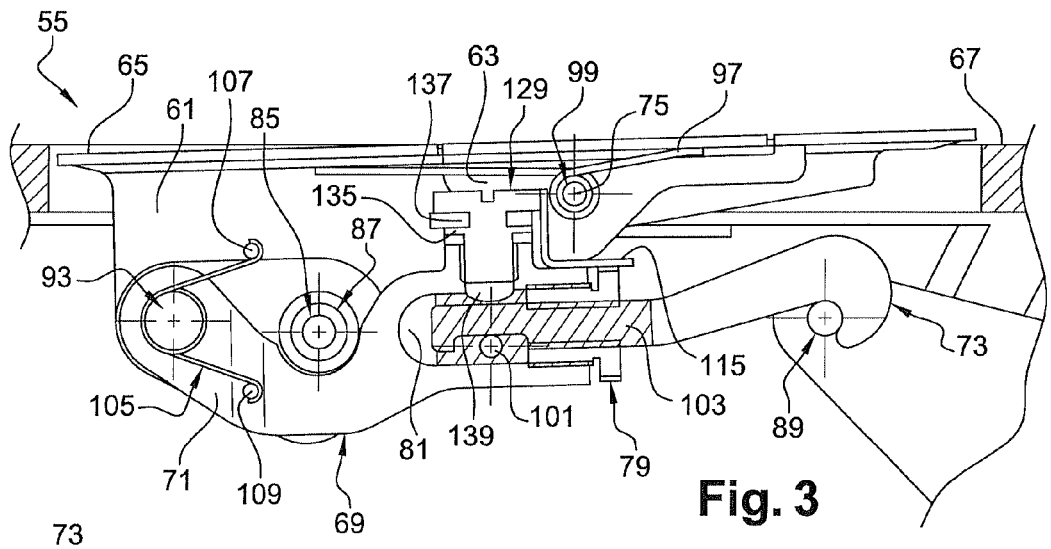
FIG. 3: a schematic representation of a cross-section of the same hook latch according to one embodiment of the invention in its environment and in a locked non-flush position.
Figure 4:
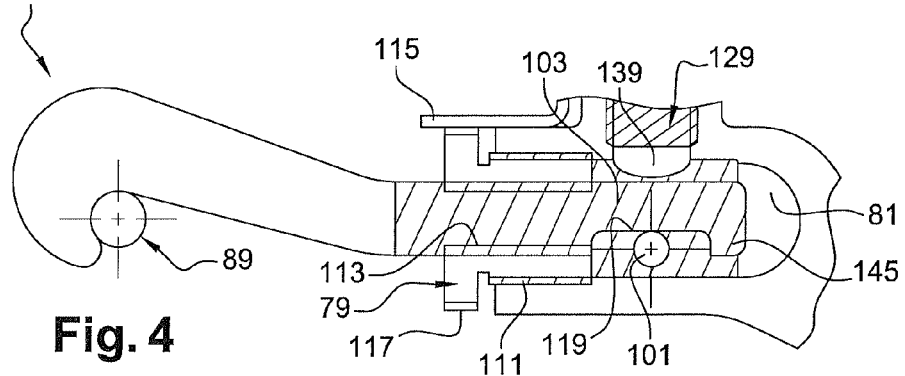
FIG. 4: a schematic representation of a close-up cross-section of a hook latch adapter according to one embodiment of the invention.
Figure 5:
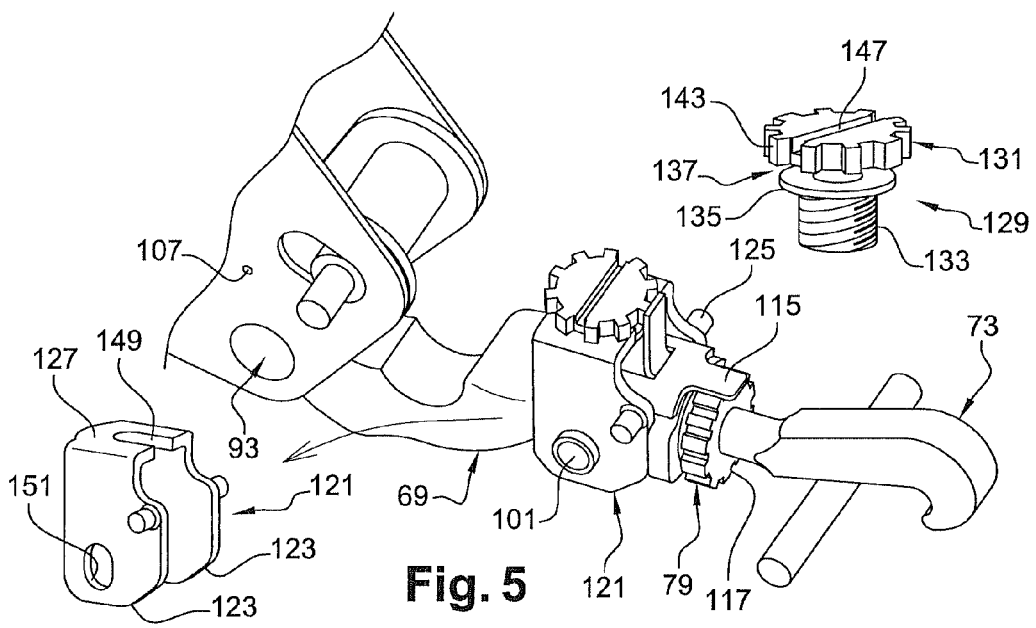
FIG. 5: a schematic representation of an oblique perspective view of the same hook latch according to one embodiment of the invention in an unlocked position.

FIGS. 3, 4 and 5 respectively represent, in a schematic manner, a cross-section of the same latch 55 in its environment and in a locked non-flush position, a close-up cross-section of the adapter 69 of the latch 55, an oblique perspective view of said latch in an unlocked position.

A locked non-flush position implies a position in which the end of the handle 61 is not aligned with the aerodynamic surface 67 of the apparatus.

The trigger 63 is stressed in rotation using a first elastic means 97. In this example, the first pivot connection axis 75 is materialised by a rivet 99. Typically, the elastic means 97 is a spring wound around the rivet 99, one side of which is resting on a lower surface of the handle 61 and the other side of which is resting on a lower surface of the trigger 63.

The adapter 69 has an overall cylindrical section in which the first recess 81 is fitted. A first pin 101 passes through the cylindrical section, thus fulfilling the function of locking the hook 73 in rotation in relation to the adapter 69. In this example, the pin 101 is a rivet which extends along an axis perpendicular to an axis along which the hook 73 extends into a rod 103.

The handle 61 and the adapter 69 are restricted in rotation using a second elastic means 105.

Typically, the second elastic means 105 is a spring wound around the rivet 93, one side of which is resting on a transversal pin 107 of the handle 61 and the other side of which is resting on a pin 109 of the elbow 71 of the adapter 69.

The hook 73 extends into the rod 103, which is threaded, the rod 103 being adapted to be screwed, via this threading and the adjustment nut 79, within the recess 81 of the adapter 69. For this purpose, the nut 79 is threaded 111 and tapped 113. In this example, the threading 111 and the tapping 113 have reverse pitches and the rotation of which is controlled via a retaining strip 115 resting against a peripheral toothing 117 of said nut. Alternatively, the pitches of the nut 79 are simply different.

Typically, the pin 101 is positioned so as to be flush with a notch 119 made in the end and at the periphery of the threaded rod 103 of the hook 73 so as to lock its rotation.

According to the invention, due to the manufacturing tolerances, once the latch 55 is installed in its environment, i.e. assembled onto the rod 85 connected to the mobile structure 57, the intermediate part 79 is screwed or unscrewed so as to adjust a stress between said latch connected to the mobile structure 57 and the fixed structure 59 of the aeroplane, and therefore push the mobile structure 57 against the fixed structure 59 of the aeroplane.

According to the invention, the device for adjusting the flushness of the handle 61 in relation to the skin 67 of the apparatus comprises:
- a bracket 121 with two lateral plates 123 represented in FIG. 4 and on which two protrusions 125 are fitted in addition to an upper connection plate 127 between these two lateral plates, and
- a screw 129 capable of being screwed into the adapter 69, comprising on the one hand a head 131 and on the other hand a shaft 133 with a shoulder 135 making up a groove 137 in which the upper plate 127 of the bracket 121 is housed.

More precisely, the adapter 69 has a second recess 139 partially tapped and opening in a manner substantially perpendicular to the first recess 81 so as to house the screw 129.

Alternatively, the screw does not have a shoulder and an elastic system enables the bracket to be brought back.

In one example, the protrusions 125 are materialised by fins extending perpendicularly to the lateral plates 123 over a length of approximately several millimetres.

The lateral surfaces of the trigger 63 each have, at their end located opposite the upper surface, a hook 141 capable of fastening one of the protrusions 125 of the bracket 121.

In this example, a periphery 143 of the head 131 of the screw 129 is toothed and the retaining strip 115 has two roles as it extends perpendicularly so as to rest against said head to control its rotation. Moreover, the part of the retaining strip 115 resting against the nut 79 extends along either side of the part resting against the head 131 of the screw 129, along and around the adapter 69 so that the pin 101 can pass through it and therefore connected it to said adapter 69.

In this example, the retaining strip 115 is flat. In a first variation, the retaining strip 115 has a slit capable of housing a notch of the peripheral toothing of the screw head. In a second variation, the retaining strip 115 has a V-shaped cross-section, the point of the V being configured so as to be inserted into the hollows of the toothing 143 of the head 131 of the screw 129.

According to the invention, the screwing of the screw 129 brings the bracket 121 closer to the adapter 69 and reduces an angle formed by the flat upper surface 65 of the handle 61 and the rod 103 of the hook 73, and the unscrewing of the screw 129 moves the bracket 121 further away from the adapter 69 and increases said angle.

In other words, screwing and unscrewing the screw 129 constitutes the adjustment in the flushness of the handle 61 in relation to the skin 67 of the apparatus.

In order to enable such an adjustment to occur, according to the invention, the strut 87 and the elbow 71 of the adapter 69 are separated by a distance equal to a value consistent with a predetermined range of adjustment for the latch. Indeed, a clearance exists between the strut 87 and the elbow 71. Given that the latch is theoretically assembled in a nominal position, the range of adjustment must be at least equal to twice the clearance so as to overcome any possible defects.

In one embodiment according to the invention, the pin 101 has a circular cross-section and is positioned so as to come into contact with a notch 119 to lock the rotation of the rod 103. The notch 119 is a hollow machined into one end of the rod 103, opposite the hook 73. The hollow has a flat bottom and curved ends capable of taking on the shape of the pin 101. The curved end opposite the hook 73 constitutes a heel 145.

When the hook 73 moves to exit the recess 81, i.e. in the event of the abusive unscrewing of said hook by the operator or in the event of the unexpected unscrewing of said hook during vehicle operation, the pin 101 abuts against the heel 145 and thus prevents the rod 103 from exiting its housing 81.

Alternatively, the notch is an oblong-shaped slit machined through the threaded part of the rod and capable of taking on the shape of the pin, one curved end of the slit, opposite the hook, constituting the heel.

Alternatively, the rod does not comprise a notch but simply a heel materialised by a protrusion which extends in a direction substantially perpendicular to a plane passing by the summits of the threads of the rod.

In this example, the head 131 of the screw 129 is flat and has a slit 147 fitted into its upper surface so as to receive the tip of a tool such as a screwdriver suited to ease the screwing and unscrewing of the screw 129. Alternatively, the screwing and unscrewing operations only take place manually.

The upper plate 127 of the bracket 121 is substantially perpendicular to the two lateral plates 123 and has a notch 149 capable of accommodating the shaft 133 of the screw 129. The lateral plates 123 of the bracket 121 have two oblong-shaped openings 151 configured so that the pin 101 can pass through it.

FIG. 6 represents, in a schematic manner, an oblique perspective view of the same hook latch according to one embodiment of the invention in a locked position.

A first plane 153 cuts the latch 55 perpendicularly to the upper surface 65 of its handle 61 passing through the centre of the pin 101.

A second plane 155 cuts the latch 55 parallel to the upper surface 65 of its handle 61 passing through the centre of the pin 101.

FIG. 7 represents, in a schematic manner, a first close-up cross-section 153 of the opposite side of the hook 73 of the same hook latch 55 according to one embodiment of the invention, in its locked position, and FIG. 8 represents a second close-up cross-section 155 of the opposite side of the hook 73 of the latch 55 in its locked position.

In this example, the shoulder 135 of the screw 129 is positioned so as to be located at a distance from the head 131 corresponding to the thickness 157, plus an operating clearance, of the upper plate 127 of the bracket 121 and parallel to the lower and upper surfaces of the head 131 so that the head 131 and the shoulder 135 are in contact, on either side, with the upper plate 127 of the bracket 121 when the groove 137 of the screw 129 is engaged within the notch 149 of the bracket 121.

The oblong-shaped openings 151 have a cross-section 159, the largest dimension of which is bigger than the largest dimension of a cross-section 161 of the pin 101. The dimension of the cross-section 159 is therefore equal to the largest dimension of the cross-section 161 plus the predetermined range of adjustment (for example two millimetres). Therefore, by virtue of the invention, the level of non-flushness of the upper surface 65 of the handle 61 can be adjusted by approximately more or less two millimetres at the end of the handle 61.

The adapter 69 has four walls 163 and 165 parallel to each other and parallel to the axis of the recess 139 of the adapter 69 so as to guide, via sliding, the bracket 121 when moving further away from and/or closer to the adapter 69.

The screw 129 is threaded so as to be screwed and/or unscrewed within the tapping of the second recess 139.

Figure 9:
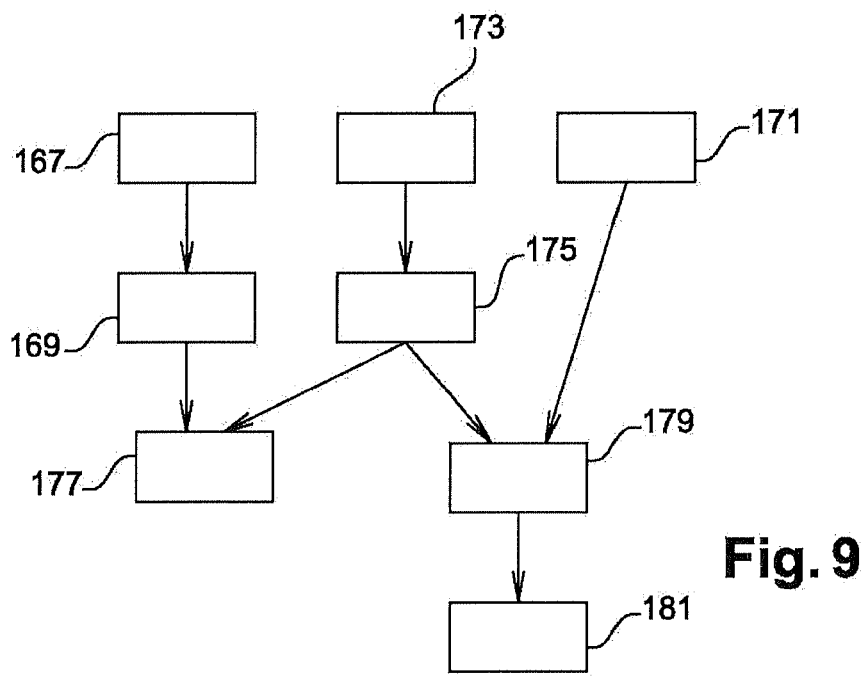
FIG. 9: a flow diagram for the implementation of the method for assembling the latch according to one embodiment of the invention.

FIG. 9 shows a flow diagram for the implementation of the method for assembling the latch 55 according to one embodiment of the invention.

Said method comprises steps in which,
the handle and the trigger are machined 167 then built in 169,
the hook, pin, nut and flushness adjustment device are machined 171,
the adapter is moulded 173 by creating two recesses within the latter,
said recesses are tapped 175 and said adapter is transversely bored, then
the adapter and the handle are assembled 177 by means of the first rivet,
said device is screwed 179 within one tapping of the adapter, and the threaded rod of the hook within the other tapping, then
the pin is inserted 181 through the bracket and the adapter.

According to one embodiment of the invention, due to the manufacturing tolerances, once the latch is installed in its environment, i.e. assembled onto the rod connected to the mobile structure, the nut is screwed or unscrewed so as to adjust a stress between said latch and the mobile and fixed structures of the aeroplane without the risk of fully unscrewing the hook.

Figure 10:
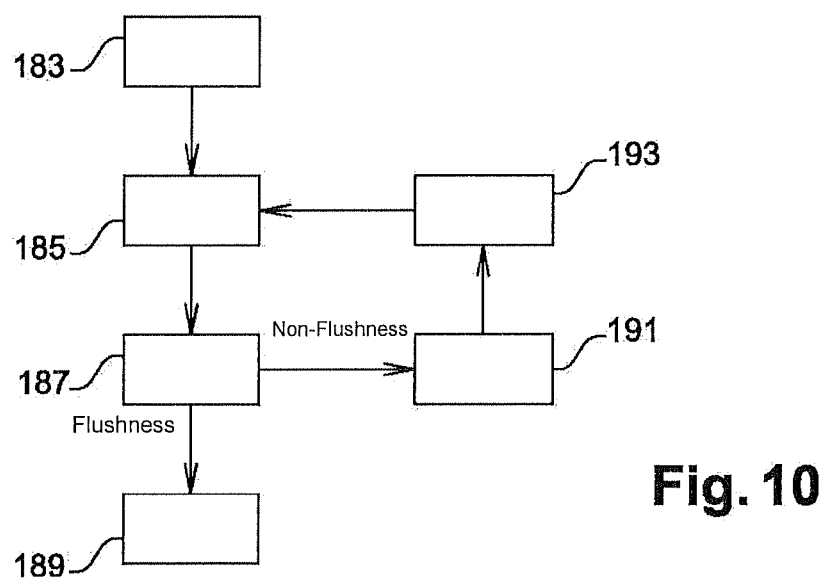
FIG. 10: a flow diagram for the implementation of the adjustment method according to one embodiment of the invention.

FIG. 10 shows a flow diagram for the implementation of the adjustment method according to one embodiment of the invention.

The adjustment method for adjusting the flushness of the upper surface of the handle in relation to the aerodynamic surface of the apparatus comprises the following steps in which
the latch is closed 185,
a potential level of flushness or non-flushness between the upper surface of the handle and the aerodynamic surface of the vehicle is assessed 187, for example by measuring, then
if the flushness corresponds to a predetermined result, the adjustment is validated 189, or
if the flushness does not correspond to said result, the latch is opened 191 and an angle formed by the handle and the adapter is adjusted 193 by screwing or unscrewing the screw, then
the latch is closed, then
the flushness or non-flushness is reassessed,
if the flushness corresponds to the predetermined result, the adjustment is validated, or
if the flushness does not correspond to the predetermined result, the level of non-flushness is reduced to obtain said result.

In one example, the assessment 187 is performed by touch and to the naked eye.

The invention is not limited to the single example described in the invention. The latch 55 can therefore be supported by the fixed structure 57, the keeper 89 therefore being supported by the mobile structure 59.

The invention claimed is:

1. A hook latch configured so as to lock and unlock a mobile structure on a fixed structure of a vehicle, one of the two structures bearing a first pivot connection axis around which the latch is guided in rotation, said latch having
an adapter fitted with a hook capable of fastening a keeper connected to the other structure, the adapter comprising a first tapped recess,
a handle comprising a trigger, at least one of the handle and trigger having an upper surface intended to be positioned flush with an aerodynamic surface of the vehicle,
on the handle, a second pivot connection axis, around which the trigger is guided in rotation within the handle,
on the trigger, at least one hook capable of fastening at least one protrusion of a movable bracket connected to the adapter,
a third pivot connection axis, around which the handle and the adapter are guided in rotation in relation to each other, and
wherein the latch comprises an adjustment device for adjusting the flushness of the upper surface of the handle in relation to an aerodynamic surface of the structure bearing the first pivot connection axis, said adjustment device comprising
the movable bracket, having two lateral plates on one of which are located the protrusion and one upper connection plate accommodating a screw,
the screw being adapted to be screwed and unscrewed within the first tapped recess of the adapter in such a way as to move the movable bracket away from and/or closer to the adaptor to adjust the flushness of the handle.

2. A latch according to claim 1, wherein
the screw head has a toothed periphery, and
the adapter comprises a retaining strip resting against said periphery.

3. A latch according to claim 1, wherein
the upper connection plate of the movable bracket is substantially perpendicular to the two lateral plates and has a notch capable of accommodating a shaft of the screw,
said plates having sections located parallel to each other,
the adapter comprises four walls parallel to each other and in contact with said sections,
the screw has, on its shaft, at a distance from the head substantially corresponding to the thickness of the movable bracket, a shoulder substantially perpendicular to said shaft.

4. A latch according to claim 2, wherein the retaining strip has
either a V-shaped cross-section, the point of the V being configured so as to be inserted into hollows of the toothing of the screw head,
or a slit capable of housing a notch of the peripheral toothing of the screw head.

5. A latch according to claim 1 or claim 2, wherein the adapter has a second recess substantially perpendicular to the first recess, at least partially tapped and within which a threaded rod of the hook is screwed via a threaded and tapped intermediate fitting part, a pin passing through said adapter and said recess and capable of coming into contact with a notch made within said rod.

6. A latch according to claim 5, wherein
the lateral plates of the movable bracket have two oblong openings capable of allowing the pin to pass through, said openings having a cross-section adapted to an adjustment of the movable bracket clearance in relation to the adapter, said adjustment being performed according to a predetermined range of adjustment,
the retaining strip extends perpendicularly in the direction of the hook so as to rest against a toothed periphery of the fitting part.

7. A latch according to claim 5, wherein the threaded rod of the hook comprises a heel capable of abutting against the pin when the hook moves to exit the recess.

8. A latch according to claim 7, wherein the pin has a circular cross-section and the notch is
either a hollow machined in the threaded rod of the hook, said hollow having a flat bottom and curved ends capable of taking on the shape of the pin, the curved end opposite the hook constituting the heel,
or an oblong-shaped slit machined through the threaded rod of the hook and capable of taking on the shape of the pin, one curved end of the slit, opposite the hook, constituting the heel.

9. A latch according to claim 7, wherein the heel is a protrusion extending in a direction substantially perpendicular to a plane passing by summits of the threads of the hook.

10. A method for assembling a hook latch according to claim 1, wherein
a handle and a trigger are machined and assembled,
a hook, a pin and a threaded and tapped intermediate fitting part are machined, the hook extending into a rod at least partially threaded,
an adapter is moulded by creating two recesses therein, extending along axes substantially perpendicular to each other,
said recesses are tapped and said adapter is transversely bored, then
the adapter and the handle are assembled by means of a first rivet extending along a pivot connection axis, wherein,
the flushness adjustment device is machined for adjusting the flushness of the handle in relation to an aerodynamic surface of the vehicle, said flushness adjustment device comprising the movable bracket and the screw in the first tapped recess, then
said flushness adjustment device is screwed within one tapping of the adapter, and the threaded rod of the hook within the other tapping, then
the pin is inserted through the movable bracket and the adapter.

11. A method for adjusting the flushness of an upper surface of a handle of a hook latch according to claim 1 in relation to an aerodynamic surface of a vehicle, wherein
the latch is closed,
a level of flushness or non-flushness between the upper surface of the handle and the aerodynamic surface of the vehicle is assessed, for example by measuring, then
if the flushness corresponds to a predetermined result, the adjustment is validated, or
if the flushness does not correspond to said result,
the latch is opened and an angle formed by the handle and the adapter is adjusted by screwing or unscrewing the screw in the first tapped recess in the adapter of the flushness adjustment device installed within the latch, such that the movable bracket is moved away from or closer to the adaptor, then
the latch is closed, then
the flushness or non-flushness is reassessed,
if the flushness corresponds to the predetermined result, the adjustment is validated, or
if the flushness does not correspond to the predetermined result, the level of non-flushness is reduced to obtain said result.

* * * * *